(12) United States Patent
Tang (10) Patent No.: US 11,714,322 B2
(45) Date of Patent: Aug. 1, 2023

(54) DISPLAY PANEL AND MANUFACTURING METHOD THEREOF

(71) Applicant: TCL CHINA STAR OPTOELECTRONICS TECHNOLOGY CO., LTD., Shenzhen (CN)

(72) Inventor: Hanting Tang, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 403 days.

(21) Appl. No.: 16/757,387

(22) PCT Filed: Feb. 20, 2020

(86) PCT No.: PCT/CN2020/076026
§ 371 (c)(1),
(2) Date: Apr. 18, 2020

(87) PCT Pub. No.: WO2021/134867
PCT Pub. Date: Jul. 8, 2021

(65) Prior Publication Data
US 2021/0405475 A1    Dec. 30, 2021

(30) Foreign Application Priority Data

Jan. 3, 2020 (CN) .......................... 202010004221.1

(51) Int. Cl.
*G02F 1/1362* (2006.01)
*G02F 1/1368* (2006.01)

(52) U.S. Cl.
CPC ...... *G02F 1/136222* (2021.01); *G02F 1/1368* (2013.01)

(58) Field of Classification Search
CPC .................. G02F 1/136222; G02F 1/1368
See application file for complete search history.

(56) References Cited

U.S. PATENT DOCUMENTS

2021/0294007 A1* 9/2021 Han ................ G02F 1/133516

FOREIGN PATENT DOCUMENTS

| CN | 104460077 A | 3/2015 |
|---|---|---|
| CN | 105259693 A | 1/2016 |
| CN | 205862052 U | 1/2017 |
| CN | 107463023 A | 12/2017 |
| CN | 107564936 A | 1/2018 |
| CN | 110361886 A | 10/2019 |

* cited by examiner

*Primary Examiner* — Lucy P Chien
(74) *Attorney, Agent, or Firm* — PV IP PC; Wei Te Chung; Zhigang Ma (57) ABSTRACT

The present invention provides a display panel and a manufacturing method Thereof. The display panel includes a plurality of sub-pixel regions distributed in an array. Each of the sub-pixel regions includes a primary pixel region and a secondary pixel region arranged adjacently. Each of the sub-pixel regions is provided with a color resist. The color resist disposed in the secondary pixel region is provided with a first hollowed-out portion, so that a thickness of the color resist disposed in the secondary pixel region is less than a thickness of the color resist disposed in the corresponding primary pixel region, and brightness of the secondary pixel region is less than brightness of the corresponding primary pixel region.

14 Claims, 6 Drawing Sheets

DISPLAY PANEL AND MANUFACTURING METHOD THEREOF

CROSS REFERENCE TO RELATED APPLICATIONS

This application claims priority to Chinese patent application No. 202010004221.1, titled "Display Panel and Manufacturing Method Thereof" in Chinese Priority Patent Application, filed on Jan. 3, 2020 with the National Intellectual Property Administration, which is incorporated by reference in the present application in its entirety.

FIELD OF INVENTION

The present invention relates to the field of display panels, and in particular, to a display panel and a manufacturing method thereof.

BACKGROUND OF INVENTION

Liquid crystal displays (LCDs) are widely used flat-panel displays, which mainly use switches of liquid crystals to modulate light field intensity of backlight sources to achieve displays.

With development of display technologies, requirements for resolution of display panels are becoming increasingly higher. As resolution increases, transmittance will decrease, which will affect display effect. How to improve transmittance at a fixed aperture ratio has become a problem for the display panel industry.

Technical Problem

The present invention provides a display panel and a manufacturing method thereof, which can improve transmittance of the display panel without changing an area size of a sub-pixel region and can relieve the problem of color shift.

Technical Solution

An embodiment of the present invention provides a display panel comprising a plurality of sub-pixel regions distributed in an array, wherein each of the sub-pixel regions comprises a primary pixel region and a secondary pixel region arranged adjacently;

wherein each of the sub-pixel regions is provided with a color resist, the color resist disposed in the secondary pixel region is provided with a first hollowed-out portion, so that a thickness of the color resist disposed in the secondary pixel region is less than a thickness of the color resist disposed in the corresponding primary pixel region, and brightness of the secondary pixel region is less than brightness of the corresponding primary pixel region.

In the display panel provided in the embodiment of the present invention, the color resist disposed in the primary pixel region is provided with a second hollowed-out portion, and a height of the second hollowed-out portion is less than a height of the first hollowed-out portion.

In the display panel provided in the embodiment of the present invention, the plurality of sub-pixel regions comprises sub-pixel regions with multiple colors, the thicknesses of the color resists corresponding to the primary pixel regions in different color sub-pixel regions are different, and the thicknesses of the color resists corresponding to the secondary pixel regions in the different color sub-pixel regions are different.

In the display panel provided in the embodiment of the present invention, the plurality of sub-pixel regions with multiple colors comprise a red sub-pixel region, a green sub-pixel region, and a blue sub-pixel region.

In the display panel provided in the embodiment of the present invention, the color resist disposed in the red sub-pixel region is a red color resist, the color resist disposed in the green sub-pixel region is a green color resist, and the color resist disposed in the blue sub-pixel region is a blue color resist.

In the display panel provided in the embodiment of the present invention, the display panel further comprises a first substrate and a second substrate opposite to each other, and a TFT array layer disposed on a side of the first substrate close to the second substrate, wherein the color resist is disposed on a side of the second substrate close to the TFT array layer.

In the display panel provided in the embodiment of the present invention, the display panel further comprises a first substrate and a second substrate opposite to each other, and a TFT array layer disposed on a side of the first substrate close to the second substrate, wherein the color resist is disposed on a side of the TFT array layer close to the second substrate.

An embodiment of the present invention further provides a display panel comprising a plurality of sub-pixel regions distributed in an array, wherein each of the sub-pixel regions comprises a primary pixel region and a secondary pixel region arranged adjacently;

wherein each of the sub-pixel regions is provided with a color resist, the color resist disposed in the secondary pixel region is provided with a first hollowed-out portion, the color resist disposed in the primary pixel region is provided with a second hollowed-out portion, and a height of the second hollowed-out portion is less than a height of the first hollowed-out portion, so that a thickness of the color resist disposed in the secondary pixel region is less than a thickness of the color resist disposed in the corresponding primary pixel region, and brightness of the secondary pixel region is less than brightness of the corresponding primary pixel region.

In the display panel provided in the embodiment of the present invention, the plurality of sub-pixel regions comprise sub-pixel regions with multiple colors, thicknesses of the color resists corresponding to the primary pixel regions in different color sub-pixel regions are different, and thicknesses of the color resists corresponding to the secondary pixel regions in the different color sub-pixel regions are different.

In the display panel provided in the embodiment of the present invention, the plurality of color sub-pixel regions comprises a red sub-pixel region, a green sub-pixel region, and a blue sub-pixel region.

An embodiment of the present invention further provides a manufacturing method of a display panel, comprising following steps of:

forming a plurality of sub-pixel regions distributed in an array, wherein each of the sub-pixel regions comprises a primary pixel region and a secondary pixel region arranged adjacently;

disposing a color resist in each of the sub-pixel regions; and forming a first hollowed-out portion on the color resist in the secondary pixel region, so that a thickness of the color resist disposed in the secondary pixel region is less than a thickness of the color resist disposed in the corresponding primary pixel region, and brightness of the secondary pixel region is less than brightness of the corresponding primary pixel region.

In the manufacturing method of the display panel provided in the embodiment of the present invention, the step of forming the first hollowed-out portion on the color resist in the secondary pixel region comprises a following step:

thinning the color resist in the secondary pixel region to form the first hollowed-out portion.

In the manufacturing method of the display panel provided in the embodiment of the present invention, the manufacturing method further comprises:

thinning the color resist in the primary pixel region to form the second hollowed-out portion, and a height of the second hollowed-out portion is less than a height of the first hollowed-out portion.

In the manufacturing method of the display panel provided in the embodiment of the present invention, the plurality of sub-pixel regions comprises sub-pixel regions with multiple colors, thicknesses of the color resists corresponding to the primary pixel regions in different color sub-pixel regions are different, and thicknesses of the color resists corresponding to the secondary pixel regions in the different color sub-pixel regions are different.

In the manufacturing method of the display panel provided in the embodiment of the present invention, the plurality of color sub-pixel regions comprises a red sub-pixel region, a green sub-pixel region, and a blue sub-pixel region.

In the manufacturing method of the display panel provided in the embodiment of the present invention, the display panel further comprises a first substrate and a second substrate opposite to each other, and a TFT array layer disposed on a side of the first substrate close to the second substrate, wherein the color resist is disposed on a side of the second substrate close to the TFT array layer.

In the manufacturing method of the display panel provided in the embodiment of the present invention, the display panel further comprises a first substrate and a second substrate opposite to each other, and a TFT array layer disposed on a side of the first substrate close to the second substrate, wherein the color resist is disposed on a side of the TFT array layer close to the second substrate.

Beneficial Effect

Compared with an exemplary method of reducing a color resist in a primary pixel region and a secondary pixel region by a same thickness to improve transmittance, a display panel provided in the present invention reduces a thickness of a color resist disposed in a secondary pixel region on a basis of ensuring that brightness of the secondary pixel region is less than a brightness of a primary pixel region, forming a first hollowed-out portion, and making the thickness of the color resist disposed in the secondary pixel region less than the thickness of the color resist disposed in the primary pixel region, which can effectively improve transmittance of the secondary pixel, thereby improving an overall transmittance of the display panel. In addition, since the brightness of the secondary pixel region is low, the brightness of the secondary pixel region can be kept lower than the brightness of the primary pixel region even when the thickness of the secondary pixel region is reduced, which can relieve the problem of color shift caused by thinning color resist, so that the color shift is within a range of specifications. Therefore, the present invention can improve the transmittance of the display panel without changing an area size of each sub-pixel region and can relieve the problem of color shift.

DESCRIPTION OF DRAWINGS

The following detailed description of specific embodiments of the present invention will make the technical solution and other beneficial effects of the present invention obvious in conjunction with the accompanying drawings.

DETAILED DESCRIPTION OF PREFERRED EMBODIMENTS

The technical solution in the embodiments of the present invention will be clearly and completely described below with reference to the accompanying drawings in the embodiments of the present invention. It is to be understood that the described embodiments are merely exemplary of the invention, and not restrictive of the full scope of the invention. All other embodiments, which can be obtained by a person skilled in the art without inventive step based on the embodiments of the present invention, are within the scope of the present invention.

In the description of the present invention, it is to be understood that the terms "center," "longitudinal," "lateral," "length," "width," "thickness," "upper," "lower," "front," "rear," "left," "right," "vertical," "horizontal," "top," "bottom," "inner," "outer," "clockwise," "counterclockwise," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise.

In the description of the present invention, it is to be noted that, unless otherwise explicitly specified or limited, the terms "mounted," "connected," and "linked" are to be construed broadly, e.g., as meaning either a fixed connection, a removable connection, or an integral connection; may be mechanically connected, may be electrically connected or may be in communication with each other; either directly or indirectly through intervening media, either internally or in any other relationship. The specific meaning of the above terms in the present invention can be understood by those of ordinary skill in the art as appropriate.

In the present invention, unless otherwise specifically defined and defined, the first feature is "on" or "under" the second feature may include that the first feature is in direct contact to the second feature, and may also include that the first feature and the second feature are not in direct contact but through additional features between them. Moreover, the first feature is "on," "above," and "under" the second feature includes the first feature is directly above and obliquely above the second feature, or merely indicating that the high of the first feature is higher than the second feature. The first feature is "below," "under," and "lower" the second feature includes the first feature is directly below and obliquely below the second feature, or merely indicating that the high of the first feature is less than the second feature.

The following disclosure provides many different embodiments or examples for implementing different features of the invention. In order to simplify the disclosure of the present invention, specific example components and arrangements are described below. Of course, they are merely examples and are not intended to limit the present invention. Moreover, the present invention may repeat reference numerals and/or letters in the various examples, such repetition is for the purpose of simplicity and clarity and does not in itself dictate a relationship between the various embodiments and/or configurations discussed. In addition, examples of various specific processes and materials are provided herein, but one of ordinary skill in the art may recognize applications of other processes and/or uses of other materials.

With the development of display technologies, resolution requirements for display panels are becoming increasingly higher. The higher the resolution, the lower the transmittance; thus, the resolution of the display panels increases as the transmittance of the display panels decreases. How to improve the transmittance without changing sizes of sub-pixel region has become a problem for display panel operators. One of the commonly used methods to increase the transmittance of an exemplary display panel is to reduce an overall thickness of red, green, and blue color resists (the same thickness is reduced). The overall transmittance of the display panel is increased by increasing the transmittance of the red, green, and blue color resists. However, the red, green, and blue color resists will cause color shift problems after they are thinned, which cannot meet color shift specifications of products. In order to solve the above technical problems, the present invention provides a display panel and a manufacturing method thereof.

Figure 1:
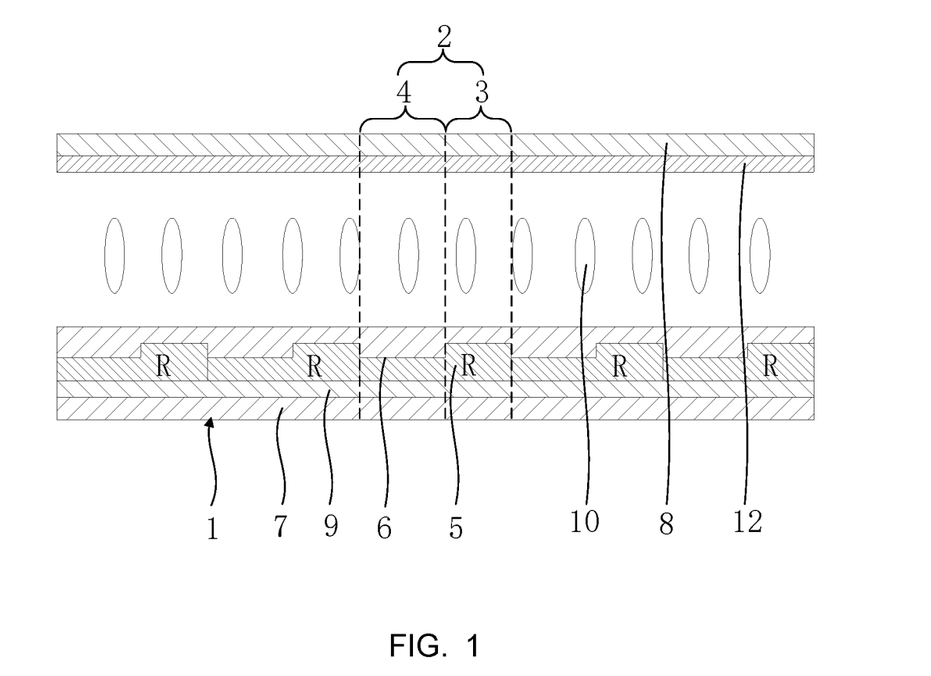
FIG. 1 is a schematic structural view of a display panel according to an embodiment of the present invention.
Figure 2:
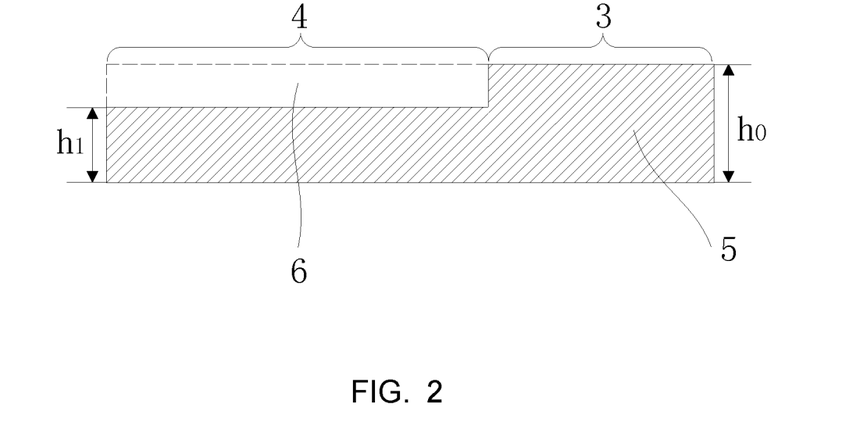
FIG. 2 is a schematic structural view of a color resist in a sub-pixel region provided in FIG. 1.

As shown in FIG. 1 and FIG. 2, an embodiment of the present invention provides a display panel 1 having an 8-domain pixel structure. The display panel 1 comprises a plurality of sub-pixel regions 2 arranged in an array. Each sub-pixel region 2 comprises a primary pixel region 3 and a secondary pixel region 4 arranged adjacently. Each sub-pixel region 2 is provided with a color resist 5. The color resist 5 disposed in the secondary pixel region 4 is provided with a first hollowed-out portion 6 so that a thickness of the color resist 5 disposed in the secondary pixel region 4 is less than a thickness of the color resist 5 disposed in the corresponding primary pixel region 3, and brightness of the secondary pixel region 4 is less than brightness of the corresponding primary pixel region 3.

Specifically, the first hollowed-out portion 6 is formed by performing a thinning process on the color resist 5 disposed in the secondary pixel region 4. That is, the first hollowed-out portion 6 is a portion where the color resist 5 of the secondary pixel region 4 is thinned, i.e., height of the first hollowed-out portion 6 is the thickness of the color resist 5 thinned out in the secondary pixel region 4. It should be noted that before the color resist 5 in the sub-pixel region 2 is not thinned (when the first hollowed-out portion 6 is not formed), the thickness of the color resist 5 in the primary pixel region 3 and the secondary pixel region 4 is h0. The thickness of the color resist 5 thinned in the secondary pixel region 4 is h1, and h1 is less than h0.

Figure 3:
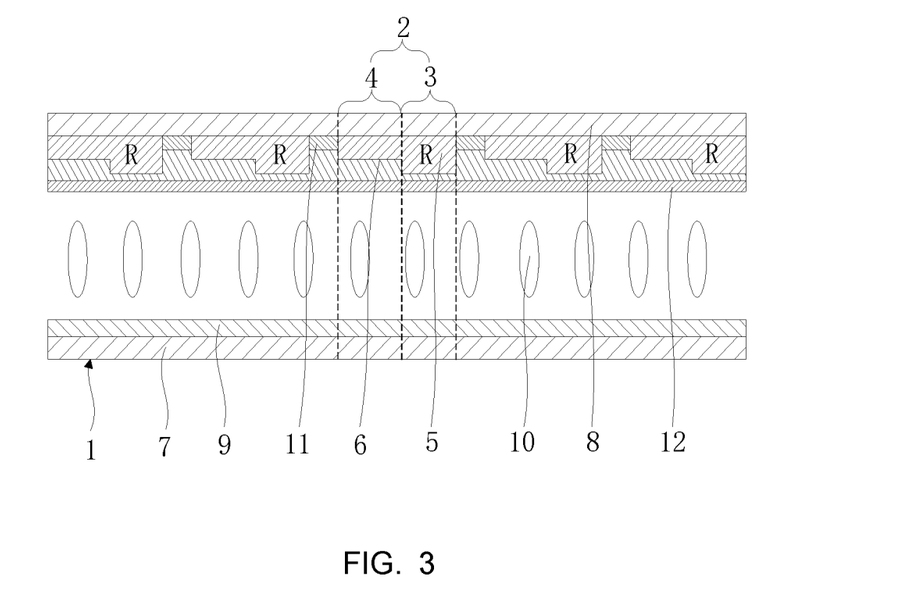
FIG. 3 is a schematic structural view of another display panel according to the embodiment of the present invention.

Specifically, as shown in FIG. 1, the display panel 1 may be a color filter on array (COA) type liquid crystal display panel. Correspondingly, the display panel 1 further comprises a first substrate 7 and a second substrate 8 disposed opposite to each other, and a thin film transistor (TFT) array layer 9 disposed on a side of the first substrate 7 close to the second substrate 8. The color resist 5 is provided on a side of the TFT array layer 9 close to the second substrate 8, and at this time, a common electrode 12 is provided on a side of the second substrate 8 close to the first substrate 7. A protective layer and a pixel electrode (not shown in the figure) are provided on a side of the color resist 5 close to the second substrate 8. Of course, as shown in FIG. 3, the display panel 1 may also be a non-COA type liquid crystal display panel. Correspondingly, the color resist 5 is disposed on a side of the second substrate 8 close to the TFT array layer 9. The display panel 1 further comprises a liquid crystal layer 10 disposed between the TFT array layer 9 and the color resist 5. A light-shielding layer is provided between two adjacent color resists 5, which can be specifically a black matrix 11, and a protective layer and a common electrode 12 are provided on a side of the color resist 5 close to the liquid crystal layer 10.

In an embodiment, the plurality of sub-pixel regions 2 comprise sub-pixel regions with multiple colors. The sub-pixel regions with multiple colors comprise a red sub-pixel region, a green sub-pixel region, and a blue sub-pixel region. The thickness of the color resist 5 corresponding to the primary pixel region 3 in the sub-pixel regions with different colors is different, and the thickness of the color resist 5 corresponding to the secondary pixel region 4 in the sub-pixel regions with different colors is different. Since transmittance of the color resists in the sub-pixel regions with different colors is different, in order to increase the transmittance of the sub-pixel regions of each color, the thickness of the color resists in the sub-pixel regions with different colors may be different.

Specifically, for the sub-pixel region 2 with the same color, the thickness of the color resist 5 disposed in the primary pixel region 3 is the same, and the thickness of the color resist 5 disposed in the secondary pixel region 4 is the same. On one hand, it can prevent the problem of uneven display brightness, on the other hand, the manufacturing process is simple and easy to operate.

Specifically, the color resist 5 comprises a red color resist (R), a green color resist (G), and a blue color resist (B). The color resist 5 corresponding to the red sub-pixel region is a red color resist, the color resist 5 corresponding to the green sub-pixel region is a green color resist, and the color resist 5 corresponding to the blue sub-pixel region is a blue color resist.

In the embodiment, compared with the exemplary reduction of the color resist 5 in the primary pixel region 3 and the secondary pixel region 4 to increase the transmittance, on the basis of ensuring that the brightness of the secondary pixel region 4 is less than the brightness of the primary pixel region 3, the present invention reduces the thickness of the color resist 5 disposed in the secondary pixel region 4 to form a first hollowed-out portion 6, so that the thickness of the color resist 5 is less than the thickness of the color resist 5 disposed in the primary pixel region 3, which can increase the transmittance of the secondary pixel region 4, thereby increasing the overall transmittance of the display panel 1. In addition, since the brightness of the secondary pixel region 4 is low, the color resist 5 of the secondary pixel region 4 can be kept lower than the brightness of the primary pixel region 3 even if the thickness of the color resist 5 is reduced. It can relieve the problem of color shift, and thus better ensures that the color shift is within a range of specifications. Therefore, the present invention can improve the transmittance of the display panel 1 and relieve the problem of color shift without changing an area size of the sub-pixel region 2.

Figure 4:
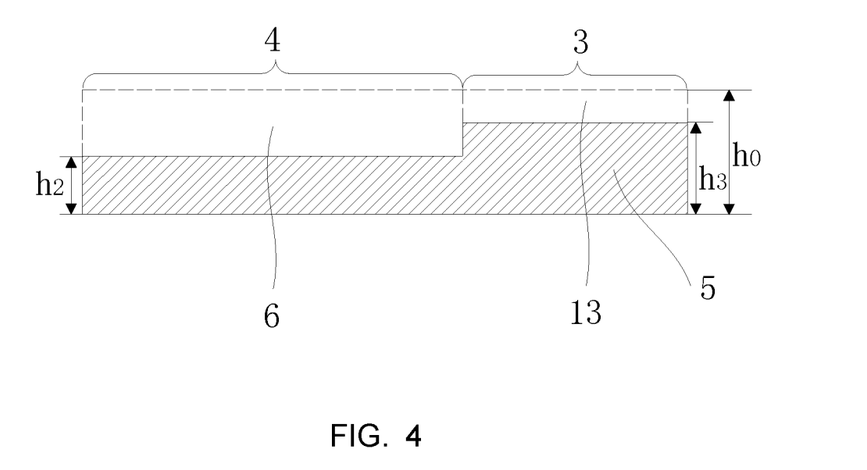
FIG. 4 is a schematic structural view of another color resist in the sub-pixel region provided in FIG. 1.

As shown in FIG. 4, an embodiment of the present invention further provides a display panel 1. The difference from the above embodiment is that the color resist 5 disposed in the primary pixel region 3 is provided with a second hollowed-out portion 13, and height of the second hollowed-out portion 13 is less than height of the first hollowed-out portion 6.

Specifically, the second hollowed-out portion 13 is formed by performing a thinning process on the color resist 5 disposed in the primary pixel region 3. That is, the second hollowed-out portion 13 is a portion where the color resist 5 of the primary pixel region 3 is thinned, i.e., the height of the second hollowed-out portion 13 is the thickness where the color resist 5 of the primary pixel region 3 is thinned. It should be noted that before the color resist 5 in the sub-pixel region 2 is thinned (when the first hollowed-out portion 6 and the second hollowed-out portion 13 are not formed), the thickness of the color resist 5 in the primary pixel region 3 and the sub pixel region 4 is h0. The thickness of the color resist 5 thinned in the secondary pixel region 4 is h2, and the thickness of the color resist 5 thinned in the primary pixel region 3 is h3. Wherein, h2 is less than h3, h3 is less than h0, and h2 is less than or equal to h1.

In the embodiment, compared with the exemplary reduction of the color resist 5 in the primary pixel region 3 and the sub pixel region 4 to increase the transmittance, on the basis of ensuring that the brightness of the secondary pixel region 4 is less than the brightness of the primary pixel region 3, the present invention reduces the thickness of the color resist 5 disposed in the secondary pixel region 4 and the primary pixel region 3 to different degrees to form the first hollowed-out portion 6 and the second hollowed-out portion 13, respectively, and the height of the second hollowed-out portion 13 is less than the height of the first hollowed-out portion 6, so that the thickness of the color resist 5 in the secondary pixel region 4 is less than the thickness of the color resist 5 in the primary pixel region 3. It can increase the transmittance of the secondary pixel region 4 and the primary pixel region 3, thereby increasing the transmittance of the entire display panel 1. In addition, since the brightness of the secondary pixel region 4 is low, the thickness of the color resist 5 disposed in the secondary pixel region 4 is thinner than the thickness of the color resist 5 disposed in the primary pixel region 3, and the brightness of the secondary pixel region 4 can still be kept lower than the brightness of the primary pixel region 3. It can relieve the problem of color shift, and thus better ensures that the color shift is within the range of the specifications. Therefore, the present invention can improve the transmittance of the display panel 1 and relieve the problem of color shift without changing the area size of the sub-pixel region 2.

Figure 5:
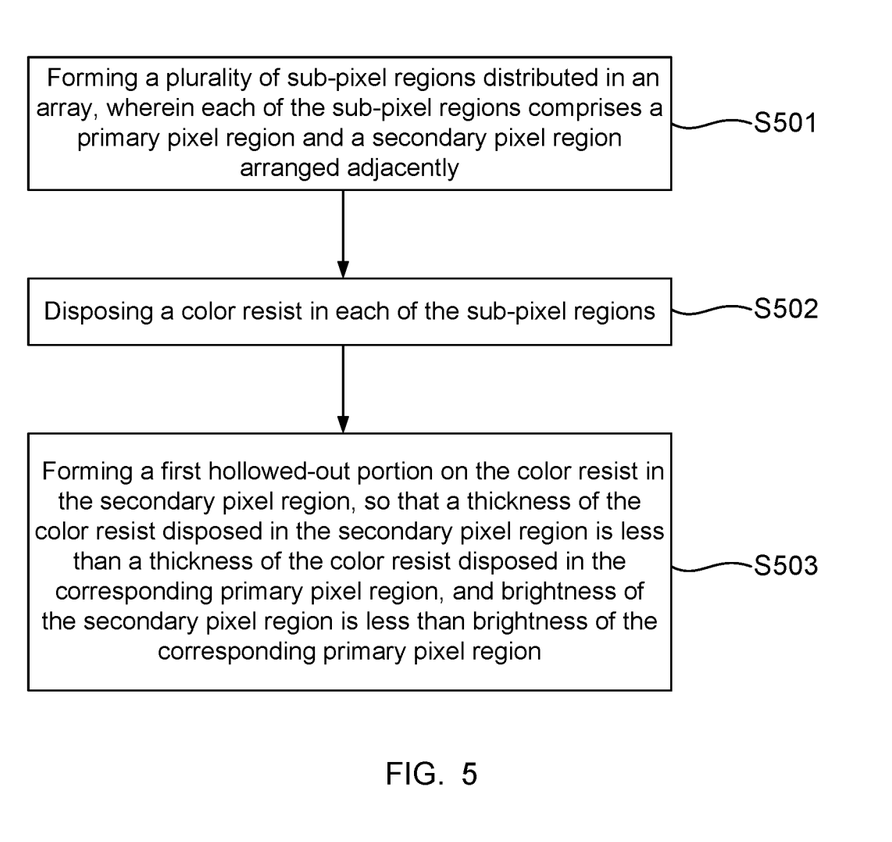
FIG. 5 is a flowchart of a manufacturing method of the display panel according to the embodiment of the present invention.

As shown in FIG. 5, an embodiment of the present invention further provides a manufacturing method of the display panel 1, comprising following steps of:

step S501: forming a plurality of sub-pixel regions distributed in an array, wherein each of the sub-pixel regions comprises a primary pixel region and a secondary pixel region arranged adjacently;

step S502: disposing a color resist in each of the sub-pixel regions; and step S503: forming a first hollowed-out portion on the color resist in the secondary pixel region, so that a thickness of the color resist disposed in the secondary pixel region is less than a thickness of the color resist disposed in the corresponding primary pixel region, and brightness of the secondary pixel region is less than brightness of the corresponding primary pixel region.

Figure 6:
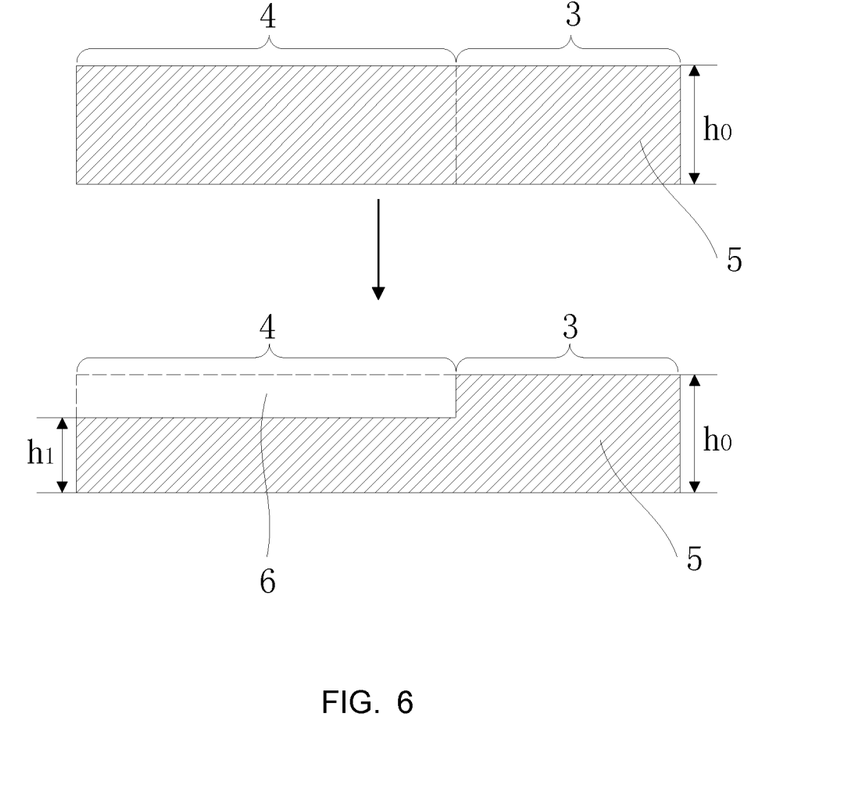
FIG. 6 is a schematic view of manufacturing a first hollowed-out portion according to the embodiment of the present invention.

Specifically, as shown in FIG. 6, step S503 comprises the following step:

thinning the color resist 5 in the secondary pixel region 4 to form the first hollowed-out portion 6.

Specifically, before the color resist 5 in the sub-pixel region 2 is not thinned (when the first hollowed-out portion 6 is not formed), the thickness of the color resist 5 in the primary pixel region 3 and the secondary pixel region 4 is h0. The thickness of the color resist 5 thinned in the secondary pixel region 4 is h1, and h1 is less than h0.

Specifically, as shown in FIG. 1, the display panel 1 may be a color filter on array (COA) type liquid crystal display panel. Correspondingly, the display panel 1 further comprises a first substrate 7 and a second substrate 8 disposed opposite to each other, and a thin film transistor (TFT) array layer 9 disposed on a side of the first substrate 7 close to the second substrate 8. The color resist 5 is provided on a side of the TFT array layer 9 close to the second substrate 8, and at this time, a common electrode 12 is provided on a side of the second substrate 8 close to the first substrate 7. A protective layer and a pixel electrode (not shown in the figure) are provided on a side of the color resist 5 close to the second substrate 8. Of course, as shown in FIG. 3, the display panel 1 may also be a non-COA type liquid crystal display panel. Correspondingly, the color resist 5 is disposed on a side of the second substrate 8 close to the TFT array layer 9. The display panel 1 further comprises a liquid crystal layer 10 disposed between the TFT array layer 9 and the color resist 5. A light-shielding layer is provided between two adjacent color resists 5, which can be specifically a black matrix 11, and a protective layer and a common electrode 12 are provided on a side of the color resist 5 close to the liquid crystal layer 10.

Specifically, the plurality of sub-pixel regions 2 comprise a red sub-pixel region, a green sub-pixel region, and a blue sub-pixel region. Correspondingly, the color resist 5 comprises a red color resist (R), a green color resist (G), and a blue color resist (B). The color resist 5 corresponding to the red sub-pixel region is a red color resist, the color resist 5 corresponding to the green sub-pixel region is a green color resist, and the color resist 5 corresponding to the blue sub-pixel region is a blue color resist.

Specifically, for the sub-pixel region 2 with the same color, the thickness of the color resist 5 disposed in the primary pixel region 3 is the same, and the thickness of the color resist 5 disposed in the secondary pixel region 4 is the same. On one hand, it can prevent the problem of uneven display brightness, and on the other hand, the manufacturing process is simple and easy to operate.

In the embodiment, by reducing the thickness of the color resist 5 disposed in the secondary pixel region 4 to form a first hollowed-out portion 6 so that the thickness of the color resist 5 is less than the thickness of the color resist 5 disposed in the primary pixel region 3, the transmittance of the secondary pixel region 4 can be increased, thereby increasing the overall transmittance of the display panel 1. In addition, since the brightness of the secondary pixel region 4 is low, the color resist 5 of the secondary pixel region 4 can be kept lower than the brightness of the primary pixel region 3 even if the thickness of the color resist 5 is reduced. It can relieve the problem of color shift, and thus better ensures that the color shift is within the range of the specification. Therefore, the present invention can improve the transmittance of the display panel 1 and relieve the problem of color shift without changing the area size of the sub-pixel region 2.

Figure 7:
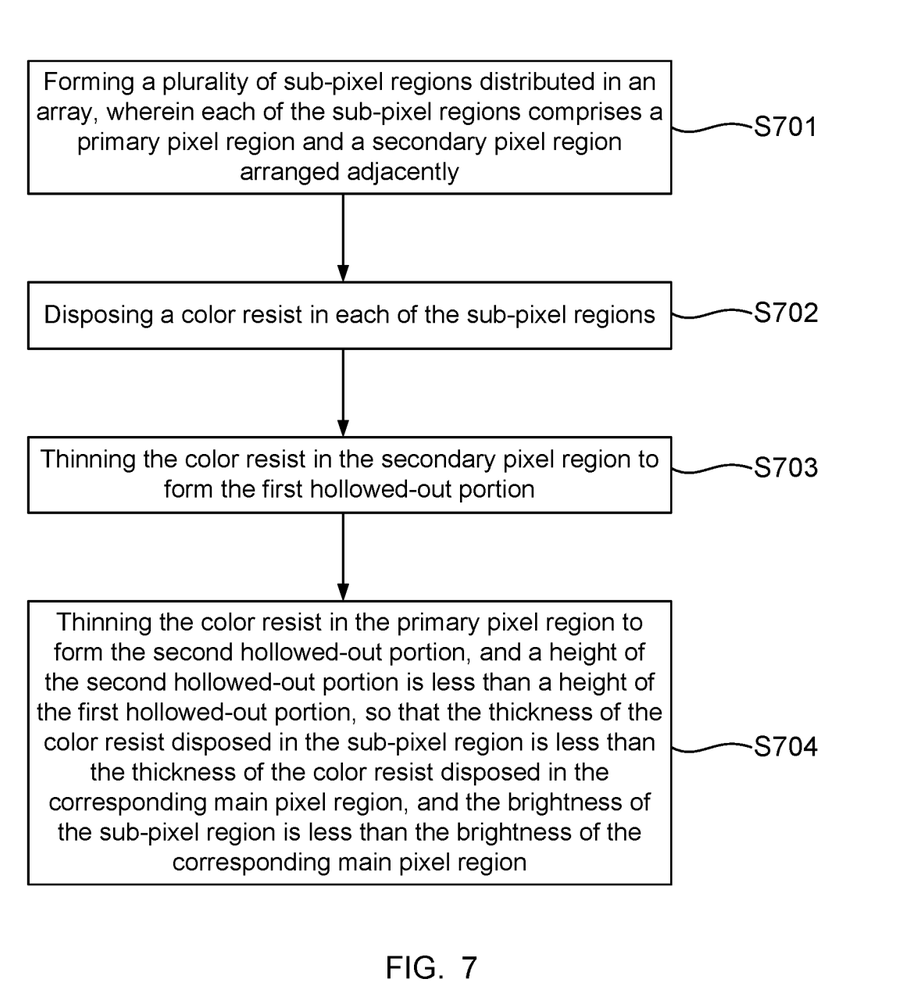
FIG. 7 is a flowchart of another method for manufacturing a display panel according to the embodiment of the present invention.

As shown in FIG. 7, an embodiment of the present invention further provides a manufacturing method for the display panel 1. The difference from the above embodiment is that it comprises the following steps:

Step S701: forming a plurality of sub-pixel regions distributed in an array, wherein each of the sub-pixel regions comprises a primary pixel region and a secondary pixel region arranged adjacently;

Step S702: disposing a color resist in each of the sub-pixel regions;

Step S703: thinning the color resist in the secondary pixel region to form the first hollowed-out portion; and Step S704: thinning the color resist in the primary pixel region to form the second hollowed-out portion, and a height of the second hollowed-out portion is less than a height of the first hollowed-out portion, so that the thickness of the color resist disposed in the sub-pixel region is less than the thickness of the color resist disposed in the corresponding main pixel region, and the brightness of the sub-pixel region is less than the brightness of the corresponding main pixel region.

Figure 8:
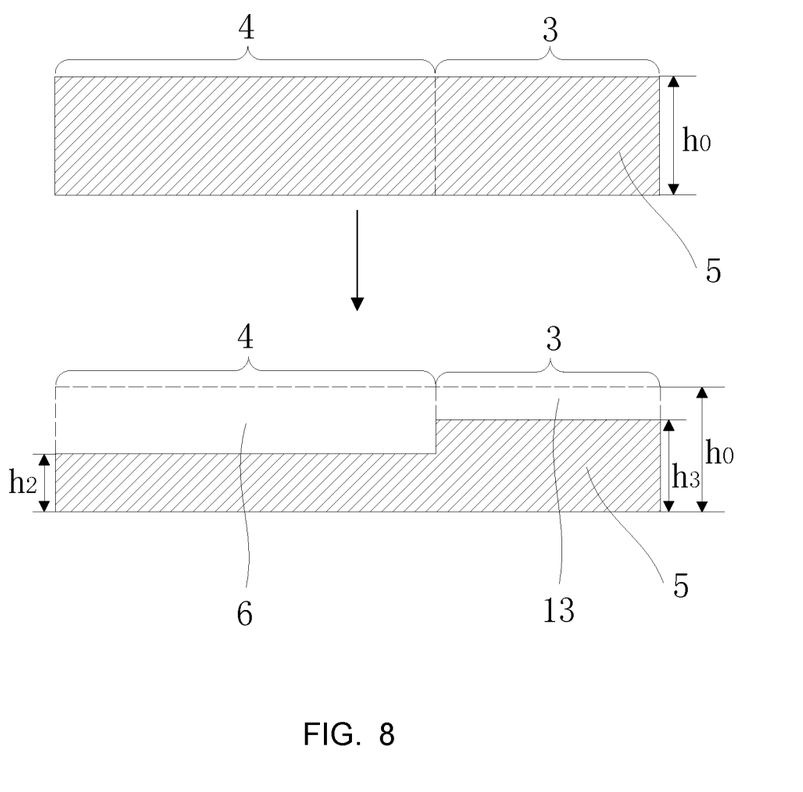
FIG. 8 is a schematic view of manufacturing the first hollowed-out portion and a second hollowed-out portion according to the embodiment of the present invention.

Specifically, the forming process of the first hollowed-out portion 6 and the second hollowed-out portion 13 is shown in FIG. 8. Before the color resist 5 in the sub-pixel region 2 is not thinned (when the first hollow-out portion 6 and the second hollow-out portion 13 are not formed), the thickness of the color resist 5 in the primary pixel region 3 and the secondary pixel region 4 is h0. The thickness of the color resist 5 thinned in the secondary pixel region 4 is h2, and the thickness of the color resist 5 thinned in the primary pixel region 3 is h3. Wherein, h2 is less than h3, h3 is less than h0, and h2 is less than or equal to h1.

In the embodiment, the first hollowed-out portion 6 and the second hollowed-out portion 13 are respectively formed by reducing the thickness of the color resist 5 disposed in the secondary pixel region 4 and the primary pixel region 3 to different degrees. In addition, the height of the second hollowed-out portion 13 is less than the height of the first hollowed-out portion 6, so that the thickness of the color resist 5 in the secondary pixel region 4 is less than the thickness of the color resist 5 in the primary pixel region 3. It can increase the transmittance of the secondary pixel region 4 and the main pixel region 5, thereby increasing the overall transmittance of the display panel 1. In addition, since the brightness of the secondary pixel region 4 is low, the color resist 5 of the secondary pixel region 4 can be kept lower than the brightness of the primary pixel region 3 even if the thickness of the color resist 5 is reduced. It can relieve the problem of color shift, and thus better ensures that the color shift is within the range of the specifications. Therefore, the present invention can improve the transmittance of the display panel 1 and relieve the problem of color shift without changing the area size of the sub-pixel region 2.

In the above embodiments, the description of each embodiment has its own emphasis. For a part that is not described in detail in an embodiment, refer to related descriptions in other embodiments.

The display panel and manufacturing method thereof provided in the embodiments of the present invention have been described in detail above. Specific examples are used in this article to explain the principle and implementation of the application. The descriptions of the above embodiments are only used to help understand the technical solution of the application and its core ideas. Those skilled in the art should understand that they can still modify the technical solutions described in the foregoing embodiments, or replace some of the technical features equivalent. These modifications or replacements do not make the essence of the corresponding technical solutions outside the scope of the technical solutions of the embodiments of the present invention.

What is claimed is:

1. A display panel, comprising:
   a plurality of sub-pixel regions distributed in an array, wherein each of the sub-pixel regions comprises a primary pixel region and a secondary pixel region arranged adjacently, wherein brightness of the secondary pixel region is less than brightness of the corresponding primary pixel region;
   wherein each of the sub-pixel regions is provided with a color resist, the color resist disposed in the secondary pixel region is provided with a first hollowed-out portion, so that a thickness of the color resist disposed in the secondary pixel region is less than a thickness of the color resist disposed in the corresponding primary pixel region,
   wherein the plurality of sub-pixel regions comprises sub-pixel regions with multiple colors, the thicknesses of the color resists corresponding to the primary pixel regions in different color sub-pixel regions are different, and the thicknesses of the color resists corresponding to the secondary pixel regions in the different color sub-pixel regions are different.

2. The display panel as claimed in claim 1, wherein the color resist disposed in the primary pixel region is provided with a second hollowed-out portion, and a height of the second hollowed-out portion is less than a height of the first hollowed-out portion.

3. The display panel as claimed in claim 1, wherein the plurality of sub-pixel regions with multiple colors comprise a red sub-pixel region, a green sub-pixel region, and a blue sub-pixel region.

4. The display panel as claimed in claim 3, wherein the color resist disposed in the red sub-pixel region is a red color resist, the color resist disposed in the green sub-pixel region is a green color resist, and the color resist disposed in the blue sub-pixel region is a blue color resist.

5. The display panel as claimed in claim 1, further comprising a first substrate and a second substrate disposed opposite to each other, and a TFT array layer disposed on a side of the first substrate close to the second substrate, wherein the color resist is disposed on a side of the second substrate close to the TFT array layer.

6. The display panel as claimed in claim 1, further comprising a first substrate and a second substrate opposite to each other, and a TFT array layer disposed on a side of the first substrate close to the second substrate, wherein the color resist is disposed on a side of the TFT array layer close to the second substrate.

7. A display panel, comprising:
a plurality of sub-pixel regions distributed in an array, wherein each of the sub-pixel regions comprises a primary pixel region and a secondary pixel region arranged adjacently, wherein brightness of the secondary pixel region is less than brightness of the corresponding primary pixel region;
wherein each of the sub-pixel regions is provided with a color resist, the color resist disposed in the secondary pixel region is provided with a first hollowed-out portion, the color resist disposed in the primary pixel region is provided with a second hollowed-out portion, and a height of the second hollowed-out portion is less than a height of the first hollowed-out portion, so that a thickness of the color resist disposed in the secondary pixel region is less than a thickness of the color resist disposed in the corresponding primary pixel region,
wherein the plurality of sub-pixel regions comprise sub-pixel regions with multiple colors, thicknesses of the color resists corresponding to the primary pixel regions in different color sub-pixel regions are different, and thicknesses of the color resists corresponding to the secondary pixel regions in the different color sub-pixel regions are different.

8. The display panel as claimed in claim 7, wherein the plurality of color sub-pixel regions comprises a red sub-pixel region, a green sub-pixel region, and a blue sub-pixel region.

9. A manufacturing method of a display panel, comprising following steps:
forming a plurality of sub-pixel regions distributed in an array, wherein each of the sub-pixel regions comprises a primary pixel region and a secondary pixel region arranged adjacently, wherein brightness of the secondary pixel region is less than brightness of the corresponding primary pixel region;

disposing a color resist in each of the sub-pixel regions; and
forming a first hollowed-out portion on the color resist in the secondary pixel region, so that a thickness of the color resist disposed in the secondary pixel region is less than a thickness of the color resist disposed in the corresponding primary pixel region,
wherein the plurality of sub-pixel regions comprises sub-pixel regions with multiple colors, thicknesses of the color resists corresponding to the primary pixel regions in different color sub-pixel regions are different, and thicknesses of the color resists corresponding to the secondary pixel regions in the different color sub-pixel regions are different.

10. The manufacturing method of the display panel as claimed in claim 9, wherein the step of forming the first hollowed-out portion on the color resist in the secondary pixel region comprises a following step:
thinning the color resist in the secondary pixel region to form the first hollowed-out portion.

11. The manufacturing method of the display panel as claimed in claim 9, further comprising:
thinning the color resist in the primary pixel region to form the second hollowed-out portion, wherein a height of the second hollowed-out portion is less than a height of the first hollowed-out portion.

12. The manufacturing method of the display panel as claimed in claim 9, wherein the plurality of color sub-pixel regions comprises a red sub-pixel region, a green sub-pixel region, and a blue sub-pixel region.

13. The manufacturing method of the display panel as claimed in claim 9, wherein the display panel further comprises a first substrate and a second substrate disposed opposite to each other, and a TFT array layer disposed on a side of the first substrate close to the second substrate, wherein the color resist is disposed on a side of the second substrate close to the TFT array layer.

14. The manufacturing method of the display panel as claimed in claim 9, wherein the display panel further comprises a first substrate and a second substrate disposed opposite to each other, and a TFT array layer disposed on a side of the first substrate close to the second substrate, wherein the color resist is disposed on a side of the TFT array layer close to the second substrate.

* * * * *